United States Patent [19]
Caramel et al.

[11] Patent Number: 5,711,859
[45] Date of Patent: Jan. 27, 1998

[54] PROCESS FOR PLASMA-CHEMICAL CONVERSION OF $N_2O$ INTO $NO_x$

[75] Inventors: André Caramel, Lyons, France; Albin Czernichowski, Orléans, France; André Gorius, Cleveland, Ohio

[73] Assignee: Rhone-Poulenc Chimie, Courbevoie Cedex, France

[21] Appl. No.: 432,163

[22] PCT Filed: Sep. 6, 1994

[86] PCT No.: PCT/FR94/01048

§ 371 Date: Jul. 14, 1995

§ 102(e) Date: Jul. 14, 1995

[87] PCT Pub. No.: WO95/07234

PCT Pub. Date: Mar. 16, 1995

[30] Foreign Application Priority Data

Sep. 10, 1993 [FR] France .................... 93 11016

[51] Int. Cl.$^6$ ............................ C01B 21/00
[52] U.S. Cl. ......................... 204/179; 204/178
[58] Field of Search ..................... 204/177, 178, 204/179; 422/186.21, 186.23

[56] References Cited

U.S. PATENT DOCUMENTS 1,035,684  8/1912  Bunet et al. ................ 204/179

FOREIGN PATENT DOCUMENTS 555110   8/1993  European Pat. Off. .
257940  11/1986  Japan .

OTHER PUBLICATIONS

"Diagnostics and Modeling of $N_2O$ RF Glow Discharges," Todd A. Cleland et al., 1997 INIST CNRS., pp. 3103–3111, Jul. 1992.

C.R. Acad. Sc. Paris, t. 272, Jean Mahenc et al., Jan. 25, 1971, pp. 345–346.

"Decomposition of $N_2O$ in a Glow Discharge," J.M. Austin et al., J. Phys. D: Appl. Phys., pp. 2236–2241, vol. 6, 1973 (no month available).

Caplus 1971; 104,395. no month available.
Caplus 1974: 43,602. no month available.
Caplus 1989: 645,952. no month available.

*Primary Examiner*—Kathryn L. Gorgos
*Assistant Examiner*—Kishor Mayekar
*Attorney, Agent, or Firm*—Burns, Doane, Swecker & Mathis, L.L.P.

[57] ABSTRACT

A process for the conversion of $N_2O$ into $NO_x$ (x=1 or 2) thereof, comprising forming a jet of gas to be treated comprising $N_2O$ and directing the jet into the interstitial space of at least two divergent electrodes placed under an electric voltage, to create at least one electric discharge and/or arc, and is part of a low-temperature plasma generator. The generator works by formation of electric discharges sliding between the electrodes such that the gas circulates along the electrodes from the discharge region where these electrodes are closest to each other. Finally, the $NO_x$ gas formed is recovered. The invention also relates to a device for carrying out the process.

18 Claims, 1 Drawing Sheet

PROCESS FOR PLASMA-CHEMICAL CONVERSION OF $N_2O$ INTO $NO_x$

BACKGROUND OF THE INVENTION

The field of the present invention is that of the treatment and the upgrading of nitrous oxide $N_2O$ (laughing gas) and, more particularly, of its conversion into a product of the type $NO_x$ where x=1 or 2, as well as into derivatives such as, for example, nitric acid $HNO_3$.

The present invention relates to a process for the plasma-chemical oxidation of dinitrogen monoxide.

DESCRIPTION OF THE PRIOR ART

Out of a volume of 100 of $N_2O$ discharged into the atmosphere, it is generally accepted that 70% is derived from metabolism in the plant kingdom, 10% from combustions of all types, 10% from internal combustion engines of motor vehicles and the remaining 10% are industrial gaseous effluents. 2% of these effluents originate from the production of nitric acid and 8% from the production of adipic acid (one of the basic components of polyamide 6,6). (Cf. 5th International Workshop on nitrous oxide emissions—Jul. 1-3, 1992 TSUKUBA [JP]).

In recent times, considerable research means and efforts have been devoted to nitrous oxide $N_2O$, since it is suggested that its accumulation in the atmosphere may constitute an environmental risk. In particular, $N_2O$ is suspected to be involved in the greenhouse effect phenomenon.

The lifetime of $N_2O$ in the atmosphere is of the order of 170 years. It is a stable gas at room temperature which virtually does not combine with molecular oxygen and which is quite resistant to the action of standard oxidizing agents.

The three main usual routes of treatment or of upgrading of $N_2O$ are:

1—thermal destruction by incineration,

2—catalytic decomposition into gaseous nitrogen and oxygen $N_2$ and $O_2$,

3—and thermal conversion into $NO_x$ where x=1 or 2 and into derivatives thereof.

The third route is particularly advantageous since the compounds $NO_x$ are recyclable, for example into nitric acid $HNO_3$. The upgrading of $N_2O$ into $HNO_3$ is of the greatest interest, especially for adipic acid producers, given that nitric acid is used to convert cyclohexanol and/or cyclohexanone, by oxidation, into adipic acid, this reaction furthermore producing approximately one mole of $N_2O$ per mole of final adipic acid. (Nylon Production: an Unknown Source of Atmospheric Nitrous Oxide—N. H. Thiemens, W. C. Trogler, *Science*, February 1991).

In order for this recycling to be viable, it is essential that the conversion of $N_2O$ into $NO_x$ should be performed in an economically profitable manner, that is to say with reduced amounts of energy, of reactants and of catalysts.

However, it is found that the $N_2O$ reaction giving $NO+½ N_2$ is in competition with the $N_2O$ reaction giving $N_2+½ O_2$.

The conversion of $N_2O$ into $NO_x$ is thus very intricate to carry out, as is illustrated by the patent JP 61 25 79 40 which relates to a process for the preparation of dicarboxylic acids in which recycling of nitric acid is carried out. According to this process, the gaseous side products of the oxidation, using nitric acid, of cyclohexanol and/or cyclohexanone into adipic acid are subjected to continuous thermal decomposition without a catalyst for converting $N_2O$ into $NO_x$. The latter compound is then converted into nitric acid by oxidation and absorption into water, according to the following reaction scheme:

$$2 NO+O_2 \rightarrow 2 NO_2$$

$$3 NO_2+H_2O \rightarrow 2 HNO_3+NO$$

The $HNO_3$ is then recycled into the reaction for the synthesis of adipic acid.

According to this Japanese patent, the gaseous side products $NO+NO_2$, which are factors limiting the conversion of $N_2O$ into $NO_x$, should be removed as fully as possible.

The starting $NO_x$ should be at a content below 10% and preferably below 5%.

The reaction temperature is between 1000° and 1300° C., and is preferably 1000° to 1200° C., and the residence time is from $10^{-2}$ to 100 seconds, and preferably from $10^{-1}$ to 10 seconds. The gas to be treated is preheated using a hot air heating appliance of the heat exchanger type. In the reactor, the rise in temperature of the gas is provided and self-maintained by the heat of decomposition.

The use of such temperatures is never a convenient operation and puts a strain on the cost price of the process.

It emerges from the examples of this patent that the best result obtained is a yield for the conversion of $N_2O$ into NO equal to 25.4%.

Under these conditions, this is generally insufficient to make the process economically attractive.

The scientific literature on this subject confirms this and teaches that the formation of NO and/or $NO_2$ represents, at most, only a few % of the $N_2O$ converted (cf. especially A. A. BORISOV, Kinet. Katal., 1968, 9 (3) 482—W. H. LIP-KEA et al., Combustion Science and Technology, 1973, 6, 257—MONAT et al., Combustion Science and Technology, 1977, 16, 21—I. S. ZASLONKO etal., Kinet Katal, 1980, 21, 311).

There is thus no choice but to accept that the thermal decomposition of $N_2O$ into $NO_x$ and/or into derivatives thereof, which however constitutes the most appealing route of upgrading, is not at the present the of sufficiently high performance to be economically feasible in industry.

SUMMARY OF THE INVENTION

In this state of the art, one of the essential aims of the present invention is to provide a process for the conversion of $N_2O$ into $NO_x$ where x=1 or 2 and/or into derivatives thereof, characterized by a yield for the production of $NO_x$ relative to the $N_2O$ converted of greater than 30 mol/mol %.

Another aim of the invention is to provide a process for the thermal conversion of $N_2O$ into $NO_x$ (x=1 or 2) and into derivatives thereof, which is easy to carry out and, in particular, which does not require the reaction chamber to be brought to high temperature.

Another aim of the invention is to provide a process for the conversion of $N_2O$ into an $NO_x$ derivative, for example of the nitric acid type.

Another aim of the invention is to provide a device for carrying out the above intended process, which contributes towards achieving the aboveselected aims for the said process.

Hence, after much experimentation and research, the Applicant has, to his credit, demonstrated that electric discharges and/or arcs could be used for the conversion of $N_2O$ into $NO_x$, with high yields of $NO_x$ relative to the $N_2O$ converted.

It follows therefrom that the above aims are achieved by the present invention, which relates to a process for the thermal conversion of $N_2O$ into $NO_x$ (x=1 or 2), and/or into derivatives thereof, in which $N_2O$ is placed in the presence of at least one electric discharge and/or arc.

More precisely, the process according to the invention consists:

in forming a jet of gas to be treated comprising $N_2O$, in directing this jet into the interstitial space of at least two divergent electrodes placed under an electric voltage, so as to create at least one electric discharge and/or arc, and being part of a low-temperature plasma generator, this generator working by formation of electric discharges sliding between the electrodes, such that the gas circulates along the electrodes from the discharge and/or arc region where the electrodes are closest to each other, and in recovering the gas comprising the $NO_x$ formed.

Such a process offers the possibility of starting the re-upgrading decomposition of the $N_2O$ at low temperature (ambient), outside of the thermodynamic equilibria. This is made possible by the sliding electric discharges and/or arcs which provide energy to the gas containing the $N_2O$ to be converted and which make it possible to generate reactive species outside thermodynamic equilibrium, the said species inducing exothermic reactions.

The yields of $NO_x$ achieved are greater than or equal to 30 mol/mol %, which is considerably above the limits generally accepted, namely 25 mol/mol %.

This result is obtained at low cost and with great flexibility and ease of implementation.

The present invention would be incomplete if it did not comprise a device for carrying out this process, the said device comprising a reactor consisting of an adiabatic jacket containing:

a low-temperature plasma generator operating by formation of sliding electric discharges and/or arcs and means for forming the jet of gas.

This generator comprises at least one, preferably at least three, pair(s) of divergent electrodes connected to electrical power supply means and arranged such that they delimit an interstitial space, forming a widening discharge zone.

BRIEF DESCRIPTION OF THE DRAWING

The invention will be better understood and others of the advantages and implementation variants thereof will emerge clearly from the description which follows, of a non-limiting embodiment of a device and of the process associated therewith, for the plasma-chemical conversion of $N_2O$ into $NO_x$ where x=1 or 2, with reference to the attached drawing in which the single FIGURE represents a principle diagram in longitudinal section of a reactor forming the subject of the invention.

DESCRIPTION OF THE PREFERRED EMBODIMENTS

Figure 1:
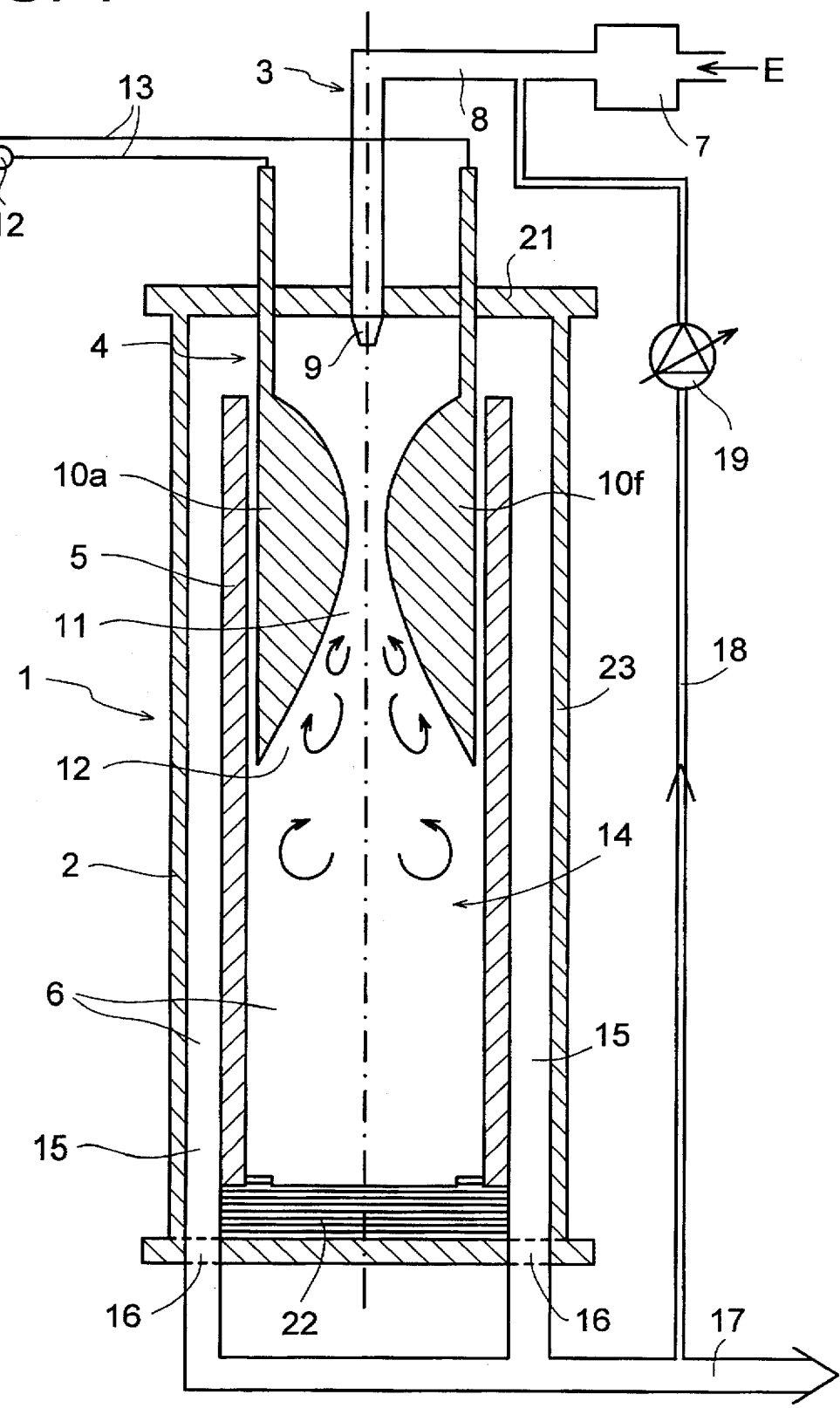

In this FIGURE, the reactor is denoted by the general reference 1. It comprises an adiabatic jacket 2 containing means for injecting 3 the gas to be converted, a sliding discharge and/or arc plasma generator 4, a tubular insert 5 for confinement of the gas and a zone for conversion 6 of the $N_2O$ into $NO_x$.

The means 3 for injecting the gas to be treated include a member 7 which allows the gas to be preheated as needed. This preheating member 7 (burner, electrical resistance, heat exchanger), is mounted on a pipe 8 for supplying the gas under pressure from the inlet E to an injection nozzle 9 mounted in the lid 21 of the jacket 2.

The nozzle 9 opens out at the base of six divergent electrodes 10a to 10f. These are conductive plates arranged in radial planes with an angular offset of 60°, and are paired together and symmetrical about the axis. These electrodes are divergent, that is to say that their facing inner edges become progressively spaced apart from the base to their free ends.

These electrodes 10a to 10f define an interstitial space or a widened-out arc and/or discharge zone 11, in which the sliding electric arcs and/or discharges are intended to move from the base to the end of the electrodes.

The electrical supply for the electrodes is provided by three-phase generators 12, represented symbolically with their connection leads 13 on the drawing.

For more precise details, reference will be made to the description of the plasma generator made by French Patent Application No. 2,639,172.

The tubular insert 5 is coaxial to the jacket 2 and is smaller than the latter in height. The insert 5 defines, with the bottom $2_2$ of the jacket 2, a space for confinement 14 of the gas entering under pressure via the nozzle 9. This space is occupied, in the upper part, by the electrodes 10a to 10f.

Moreover, the insert 5 defines, with the wall $2_3$ of the jacket 2, an external annular chamber 15. This chamber communicates with the inside of the insert 5 at the jacket head and comprises at its base openings 16 connected from the pipes 17 for evacuating the treated gas to the outside. Some of the gas arriving at this point may be recycled via a pipe 18, connecting the evacuation pipe 17 to the inlet pipe 8. Circulation of the gas inside this pipe 18 is placed under the control of a pump 19, which may also be a part of the nozzle 9.

It is entirely possible to envisage combining this device, by integration or in an independent manner separate from the reactor for conversion of the $N_2O$ into $NO$, with a module for conversion of the $NO_x$ into derivatives thereof, of the nitric acid type.

This module may, for example, comprise means for cooling the gases exiting after conversion, and means for conversion strictly speaking.

A water quenching system constitutes an advantageous example of cooling means, especially on account of the fact that it makes it possible to avoid the decomposition of the $NO_x$ via a reverse-Zeldovich type mechanism.

The conversion means are preferably formed by an oxido-absorption system, preferably by a water oxido-absorption column.

As a variant of the device, provision may be made to include a so-called "piston" elongate adiabatic chamber into the reactor, so as to optimize the conversion of $N_2O$ into $NO_x$.

In accordance with a preferred characteristic of the invention, the materials constituting the reactor and/or the electrodes are ceramics.

Such a confirmation of the reactor 1 has the effect, in the operating mode, of causing the gas entering under pressure via the nozzle 9 to be forced back from the bottom $2_2$ of the confinement space 14 to the top part comprising the electrodes 10a to 10f.

A turbulent regime is thus established in the space 14 and more particularly in the discharge and/or arc zone 11, which may also be referred to as the turbulence zone.

The gas forced back under pressure then passes into the external annular chamber 15 via the open upper end of the insert 5.

The gas is then conveyed to the outlet by circulating through openings 16 of the evacuation pipes 17.

The zone for the plasma-chemical conversion 6 of $N_2O$ into $NO_x$ is partly in the confinement space, especially in the lower part thereof, and partly in the zone 11 of the electrodes 10a to 10f and in the external annular chamber 15.

As regards the process for the plasma-chemical conversion of $N_2O$ into $NO_x$ and/or into derivatives thereof, it should be pointed out that it is preferable to carry it out at a pressure between 0 and $10\times10^5$ Pa, preferably between 0 and $6\times10^5$ Pa and even more preferably at normal atmospheric pressure ($1\times10^5$ Pa).

The gas to be converted consists of pure $N_2O$ or of substantially pure $N_2O$ or alternatively of a mixture of $N_2O$ with air or $N_2$ and/or $O_2$ and/or $CO_2$ and/or NO and/or $NO_2$ or any other gas which is suitable to constitute a gaseous dispersing medium for $N_2O$. It is important for the $NO_x$ content of the gas to be converted to be less than 10% by volume, preferably less than 5% by volume.

The gaseous mixture to be treated may, for example, be a residue of nitrous vapours obtained by water treatment of the gases obtained after nitric oxidation of cyclohexanone and/or cyclohexanol during the formation of adipic acid.

In addition, the Applicant has been able to demonstrate that it is particularly advantageous to remove the water vapour from the gaseous mixture containing the $N_2O$ to be converted.

Any suitable and appropriate means is used to do this, such as, for example, condensation by cooling of the jet of gas to be converted.

The inlet temperature of the gas jet in the discharge zone is advantageously between 0° and 800° C., preferably between 400° and 700° C., it being possible for the optional preheating of the inlet gas to be provided by recycling of the effluent gases.

The speed of the gas jet at the reactor inlet is an important parameter of the process. This parameter is advantageously set at between 5 and 30 m/s, preferably between 7 and 20 m/s and even more preferably at a value of the order of 10 m/s.

According to another particularly advantageous aspect of the process according to the invention, the gas to be treated is subjected to a very turbulent regime in the discharge zone 11 of the generator (turbulence zone).

The electric discharges and/or arcs are essential for the provision, outside the thermodynamic equilibrium state, of reactive species which enable the $N_2O$ to be converted into $NO_x$. One of the advantages provided by the sliding discharges and/or arcs is reduced wear of the electrodes.

The electrical power used is advantageously between 0.01 and 1, preferably between 0.02 and 0.5 and even more preferably this power is of the order of 0.15±0.05 kWh/kg of inlet $N_2O$.

Given that the conversion of $N_2O$ into $N_2$ and $O_2$ is highly exothermic (approximately 80 kJ/mol), the thermal decomposition started or initiated by the low-temperature plasma generator, working by formation of sliding electric discharges and/or arcs between the divergent electrodes, is thermally self-maintained.

The examples which follow of the process for the conversion of $N_2O$ into $NO_x$ (x=1 or 2), with the aid of the device described above, in accordance with the invention, allow this process to be better understood and show some of the advantages and variants thereof.

EXAMPLES 1 TO 14

1. Apparatus:

The device used is comparable to that represented in the single FIGURE. The low-temperature plasma generator is capable of producing, on the divergent electrodes, three-phase sliding electric discharges, characterized by high operating voltages (a few kV) and relatively low currents (fractions of an ampere). This process is sequential. The lifetime of a discharge is between 5 and 20 milliseconds, depending on the speed of the injected gas.

2. Reactant-product—reaction conditions

The experiments in the present example are performed using homogeneous mixtures of $N_2O$ with $N_2$, $O_2$, $CO_2$ and/or NO, stored at a pressure which my be up to 67 bar.

The flow rate of the inlet gas is varied from 12.7 to 50.5 Normoliters per minute. The initial temperature of the gas is close to room temperature: about 25° C.

In the experiments which follow, the temperature of the inlet gas jet varies between 38° and 355° C.

The electrical power dissipated in the reactor was measured using a three-phase analogue energy counter at the inlet of the power supply system. The power varies between 0.8 and 2.1 kW.

In the context of the experiments which follow, the conversion of $NO_x$ into derivatives such as $HNO_3$ was not carried out. The converted gases were simply collected for analysis.

3. Analyses:

Two types of analysis were carried out: a chromatographic analysis and a chemical analysis.

As regards the chromatographic analysis, the apparatus and the operating conditions are as follows:

chromatograph: Chrompack 9001

Carrier gas: helium; flow rate 5.5 ml/min

Two columns: "wide-bore" (GS-Molsieve 30 m×0.539 mm and GS-Q 30 m×0.539 mm) and a "back-flush" system Detector: thermal conductivity detector Integrator: Shimadzu C-R5A Oven temperature: 30° C.

Calibration: air, $N_2O$ and pure $CO_2$ before and after a series of experiments Injection: via a 0.25 cm$^3$ gas loop; transfer of the gases via a 400 cm$^3$ syringe.

The chemical analysis consists of an acidimetric assay of the $NO_x$ resulting from the placing in contact of the outlet gaseous mixture with aqueous hydrogen peroxide solution and assaying of the $HNO_3$ using NaOH or KOH.

4. Results:

Examples 1 to 5 show the effect of the variation in temperature of the inlet gas jet.

The aim of Examples 6 to 8 is to show the influence of the content of water vapour in the inlet gas jet.

Examples 9 to 12 show what effects variation in the flow rate of the inlet gas may have: 22 to 180 Nl/min.

Examples 13 and 14 demonstrate the consequences of the presence of $NO_2$ in the inlet gas.

The parameters and the results of Examples 1 to 14 are given in the table below.

In this table, I and O mean "inlet" and "outlet" of the reactor respectively.

M=molar mass t=temperature $DC_{N2O}$=Degree of conversion of the $N_2O$=(number of moles of $N_2O$ I−number of moles of $N_2O$ O)/number of moles of $N_2O$ I)

$R_{NO}$=yield of $NO_x$=(number of moles of $NO_x$ O−number of moles of $NO_x$ I)/(number of moles of $N_2O$ I−numbers of moles of $N_2O$ O)

The results are collated in Table 1 below.

TABLE 1

| Ex. | $N_2O$ I mol % | $N_2$ I mol % | $O_2$ I mol % | $H_2O$ I mol % | $CO_2$ I mol % | $NO_2$ I mol % | Flow rate I Nl/min | T I °C. | P elec kW | $N_2O$ O mol % | $NO_2$ O % pds | DC $N_2O$ mol/mol | Y NO mol/mol |
|---|---|---|---|---|---|---|---|---|---|---|---|---|---|
| 1  | 47.0 | 41.4 | 11.6 | 0.0 | 0.0 | 0.0  | 37.4  | 38  | 1.18 | 28.5 | 7.5  | 29.3 | 42.9 |
| 2  | 47.0 | 41.4 | 11.6 | 0.0 | 0.0 | 0.0  | 45.70 | 50  | 1.19 | 33.1 | 7.3  | 19.7 | 62.2 |
| 3  | 47.0 | 41.4 | 11.6 | 0.0 | 0.0 | 0.0  | 37.4  | 140 | 1.16 | 29.6 | 8.9  | 21.9 | 68.1 |
| 4  | 47.0 | 41.4 | 11.6 | 0.0 | 0.0 | 0.0  | 37.4  | 226 | 1.06 | 27.9 | 8.8  | 27.0 | 54.4 |
| 5  | 47.0 | 41.4 | 11.6 | 0.0 | 0.0 | 0.0  | 37.4  | 355 | 1.04 | 27.7 | 8.7  | 28.0 | 51.7 |
| 6  | 50.9 | 33.9 | 10.8 | 0.0 | 4.4 | 0.0  | 37.4  | 25  | 0.97 | 34.7 | 8.8  | 26.1 | 55.7 |
| 7  | 49.3 | 32.9 | 10.4 | 3.1 | 4.3 | 0.0  | 45.70 | 25  | 0.93 | 33.0 | 5.1  | 27.7 | 30.8 |
| 8  | 47.8 | 31.9 | 10.1 | 6.1 | 4.1 | 0.0  | 37.4  | 25  | 0.93 | 32.7 | 4.6  | 27.4 | 28.4 |
| 9  | 43.8 | 43.9 | 12.3 | 0.0 | 0.0 | 0.0  | 22.00 | 51  | 0.88 | 22.9 | 8.5  | 47.2 | 31.7 |
| 10 | 43.8 | 43.9 | 12.3 | 0.0 | 0.0 | 0.0  | 61    | 52  | 0.62 | 34.1 | 6.1  | 23.4 | 45.9 |
| 11 | 43.8 | 43.9 | 12.3 | 0.0 | 0.0 | 0.0  | 70.40 | 62  | 1.09 | 34.0 | 5.6  | 23.2 | 42.6 |
| 12 | 43.8 | 43.9 | 12.3 | 0.0 | 0.0 | 0.0  | 81.80 | 53  | 1.11 | 30.8 | 5.0  | 29.0 | 30.7 |
| 13 | 31.6 | 46.2 | 12.2 | 0.0 | 0.0 | 10.0 | 46    | 25  | 0.98 | 14.4 | 17.0 | 59.2 | 7.1  |
| 14 | 31.6 | 45.2 | 12.7 | 0.0 | 0.0 | 10.6 | 56    | 25  | 1.07 | 16.8 | 18.2 | 51.2 | 9.5  |

We claim:

1. A process for the plasma-chemical conversion of $N_2O$ gas into $NO_x$ gas wherein x equals 1 or 2, said process comprising:

forming a jet of gas to be treated comprising $N_2O$, directing said jet into an interstitial space of a least two divergent electrodes placed under an electric voltage, to create at least one electric discharge which is part of a plasma generator, said generator working by formation of electric discharges sliding between the electrodes, such that the jet of gas circulates along the electrodes from the discharge region where these electrodes are closest to each other, and recovering a gas comprising the $NO_x$ formed.

2. Process according to claim 1, further comprising the step of subjecting the gas comprising the $NO_x$ formed to a conversion treatment to obtain nitric acid.

3. Process according to claim 2, wherein the treatment is a water oxido-absorption on a column.

4. Process according to claim 3, wherein the treatment is combined with a water quenching system.

5. Process according to claim 1, wherein the jet of gas injected into the interstitial space of the electrodes is free or substantially free of water vapor.

6. Process according to claim 1, wherein the conversion of $N_2O$ into $NO_x$ is performed at a pressure between 0 and $10 \times 10^5$ Pa.

7. Process according to claim 6, wherein the conversion of $N_2O$ into $NO_x$ is performed at a pressure between 0 and $6 \times 10^5$ Pa.

8. Process according to claim 7, wherein the conversion of $N_2O$ into $NO_x$ is performed at atmospheric pressure ($10^5$ Pa).

9. Process according to claim 1, wherein provision is made for an inlet temperature of the jet of gas in the electric discharge region of between 0° and 800° C.

10. Process according to claim 9, wherein provision is made for an inlet temperature of the jet of gas in the electric discharge region of between 400° and 700° C.

11. Process according to claim 1, wherein the jet of gas directed into the interstitial space is set at a speed of between 5 and 30 m/s.

12. Process according to claim 11, wherein the jet of gas directed into the interstitial space is set at a speed of between 7 and 20 m/s.

13. Process according to claim 12, wherein the jet of gas directed into the interstitial space is set at a speed of approximately 10 m/s.

14. Process according to claim 1, wherein the jet of gas to be treated is subjected to a turbulent regime in the electric discharge region.

15. Process according to claim 1, wherein the jet of gas to be treated is free of $NO_x$ or substantially free of $NO_x$ before directing the jet of gas into the discharge region.

16. Process according to claim 1, wherein provision is made for a dissipated electric power in the plasma generator of between 0.01 and 1 kWh/kg of inlet $N_2O$.

17. Process according to claim 16, wherein provision is made for a dissipated electric power in the plasma generator of between 0.02 and 0.5 kWh/kg of inlet $N_2O$.

18. Process according to claim 17, wherein provision is made for a dissipated electric power in the plasma generator of approximately 0.15±0.05 kWh/kg of inlet $N_2O$.

* * * * *